March 3, 1953  L. A. PARADISE  2,630,063
BALING PRESS PLUNGER WITH DISCONNECTIBLE KNIFE
Filed March 10, 1950  2 SHEETS—SHEET 1

INVENTOR.
L. A. PARADISE

ATTORNEYS

March 3, 1953  L. A. PARADISE  2,630,063
BALING PRESS PLUNGER WITH DISCONNECTIBLE KNIFE
Filed March 10, 1950  2 SHEETS—SHEET 2
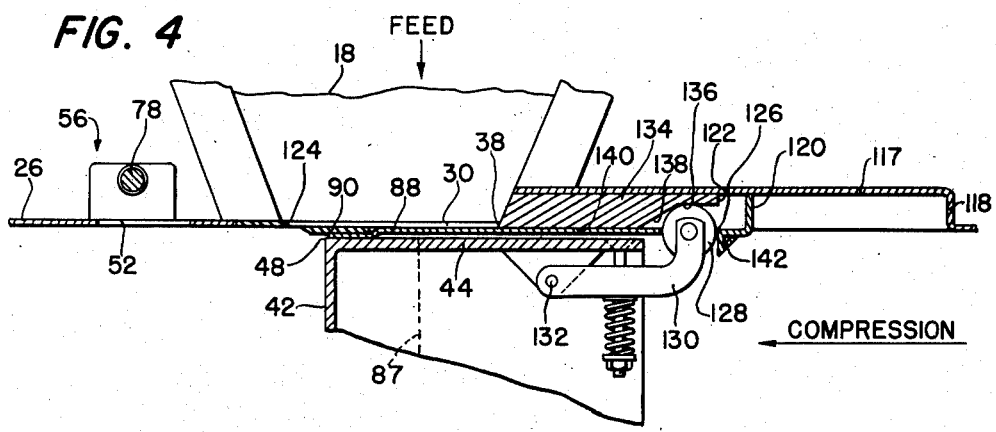
FIG. 4
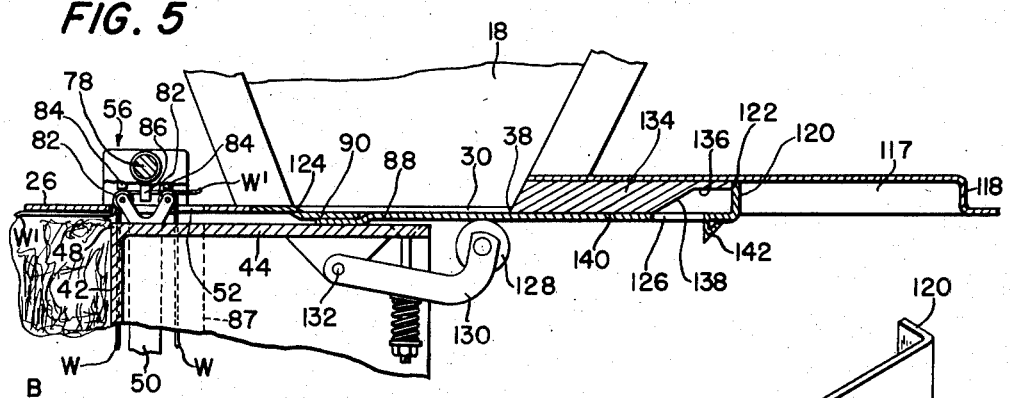
FIG. 5
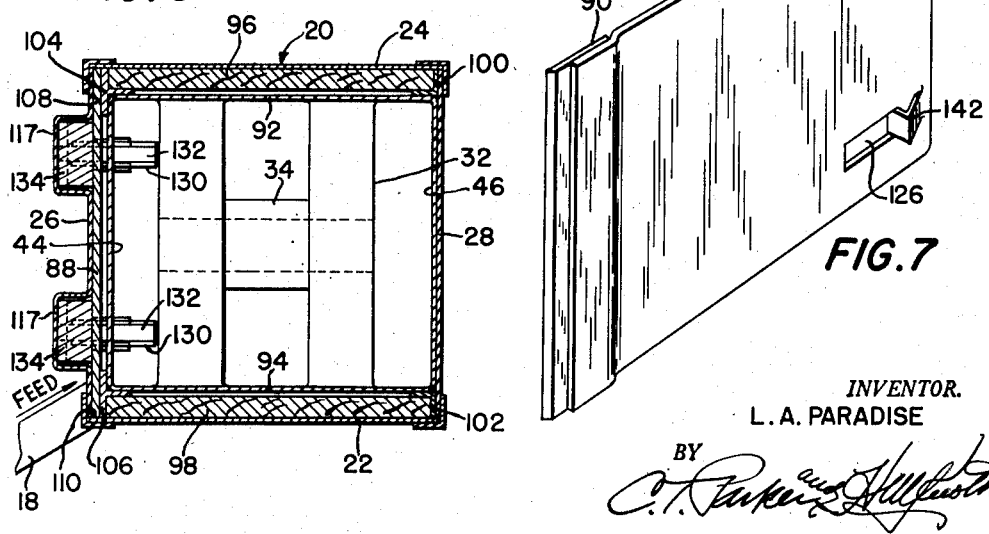
FIG. 6
FIG. 7
INVENTOR.
L. A. PARADISE
BY
ATTORNEYS Patented Mar. 3, 1953

2,630,063

UNITED STATES PATENT OFFICE 2,630,063

BALING PRESS PLUNGER WITH DISCONNECTIBLE KNIFE

Louis A. Paradise, Moline, Ill., assignor to Deere & Company, Moline, Ill., a corporation of Illinois Application March 10, 1950, Serial No. 148,837

2 Claims. (Cl. 100—98)

This invention relates to a baling press and more particularly to an auxiliary device such as a material-slicing knife releasably connected to the plunger of such press.

Although, as will be seen from the description to follow, the principles of the invention have relatively wide application, the herein disclosed form of the invention was designed primarily for use in balers of the pick-up type customarily employed on farms for the picking up and baling of hay, straw, etc. A typical baler of this character includes a mobile frame which may be drawn behind a tractor or vehicle or otherwise propelled over a field on which hay, straw, etc., is lying. The baler is equipped with pick-up mechanism for picking up the material from the ground and for delivering the material rearwardly through a feed opening into a bale chamber in which a baling plunger reciprocates to form the material into bales, the bales being successively tied and discharged at one end of the bale chamber. The bale chamber is normally made up of a plurality of walls arranged in such manner that the bale chamber is rectangular in section. One of the walls has a rectangular opening therein through which material is fed to be engaged by the leading or front face of the plunger as the plunger reciprocates. The stroke of the plunger on compression is such that the leading face of the plunger passes an edge portion of the opening along which material may be severed or sliced by virtue of a fixed knife along said edge portion and a cooperative knife carried by the plunger. The result is that a bale is made up of a plurality of charges each separated from the other because of the slicing or severing action occurring as the material is sheared between the fixed and reciprocating knives.

Some balers of the general character referred to are fully automatic; that is, they are provided with automatic tying mechanism which functions to tie a bale with wire or twine after the bale has attained a predetermined size, normally determined on the basis of length. A baler of this character will have its bale chamber provided with a feed opening in a vertical wall thereof. Hence, the shearing function of the knives will occur in the vertical plane of this wall. Further, since the baler is fully automatic it is desirable to design the tying mechanism so that it will operate without requiring stoppage of the plunger. Typical tying mechanism includes one or more needles movable transversely of the bale case to bring a strand of twine or wire around the bale to the tying mechanism which is located on one wall of the bale chamber. Obviously, the needle must move through a portion of the zone in which the plunger moves on its compression stroke. The conflicting presence of the plunger and needle or needles in the same zone is resolved by providing the leading face of the plunger with slots or recesses to accommodate the needles. Hence, even though the needles are in tying position, the plunger may reciprocate without damaging the needles.

On the basis of a design such as that outlined above, it has heretofore been necessary to mount the needles for movement across the bale chamber in planes parallel to the plane of the wall in which the feed opening is formed. That is to say, if the feed opening is in a vertical wall, the needles move in vertical planes, normally from retracted positions below the bottom or floor of the bale chamber to tying positions projected upwardly through the bale chamber. The reason for this is that the plunger must be slotted to receive the needles in planes parallel to the wall in which the feed opening is provided, because the shearing edges of the knives must be continuous. That is, the knife on the plunger could not be slotted to accommodate the needles, for it would lose its shearing function with the fixed knife along the feed opening.

Although balers of the general design referred to above have been found quite satisfactory in the past, it is recognized that certain disadvantages result from the requirement that the needles be placed below the bale chamber to operate in the manner described. Among these disadvantages are increased height of the baler and the necessity for tying the bale across the shorter of its two transverse dimensions (the bale in section being a somewhat elongated rectangle rather than a perfect square). It has been determined that a better bale can be formed in a bale chamber having its shorter dimension horizontal, because the feeding mechanism that feeds material through the feed opening would then have to travel through a shorter path. However, this would necessitate mounting of the needles so that they move in horizontal planes. As stated above, such movement of the needles would be impossible because of interference with the knife.

According to the present invention, these desirable results are made possible by the provision of a knife that is releasably carried by the plunger so that the knife can be stopped after it has performed its severing or shearing function, whereby the plunger may continue past the feed opening while the knife is retained in its stopped position. Thus, the shearing or cutting edge of the knife may be made continuous and the knife will lose none of its efficiency. At the same time, the plunger may be slotted as usual to receive the tying needles. Yet, the slots may be provided in planes normal or perpendicular to the plane in which the knife operates. In short, the plunger may function with respect to its operation in connection with the needles during the tying operation, just as if it had no knife thereon. Yet, a knife is provided that has all the functional characteristics of knives heretofore used for slicing the material to provide separate charges.

One of the primary objects of the present invention is to provide a baler construction in which the knife or equivalent auxiliary device is carried by the plunger for movement with the plunger during part of the movement of the plunger, whereby the plunger may have a range of movement in which it moves without the knife.

It is an important object of the invention to provide a plunger and auxiliary device or knife of the character referred to which will result in overall improvement of the operating efficiency of a baler without materially altering the basic design thereof. A further object is to utilize the characteristics of the present invention for the purpose of simplifying and lowering the cost of balers in general.

The foregoing and other important and desirable objects and features of the invention will become apparent to those versed in the art as a preferred embodiment of the invention is fully disclosed in the following detailed description and accompanying sheets of drawings, in which Figure 1 is a plan view showing the general construction of a typical baler, a portion of the bale chamber being broken away to disclose the incorporation of the invention into the baler;

Figure 4 is a fragmentary sectional view taken in a plane at right angles to the plane of the section in which Figures 2 and 3 are taken, this view being on an enlarged scale and showing the plunger and knife in the positions they occupy just prior to release of the knife from the plunger;

Figure 5 is a view similar to Figure 4 but showing the plunger and knife released;

Figure 6 is a transverse sectional view on an enlarged scale taken substantially on the line 6—6 of Figure 1; and Figure 7 is a perspective view of the knife and carrier.

Figure 1:
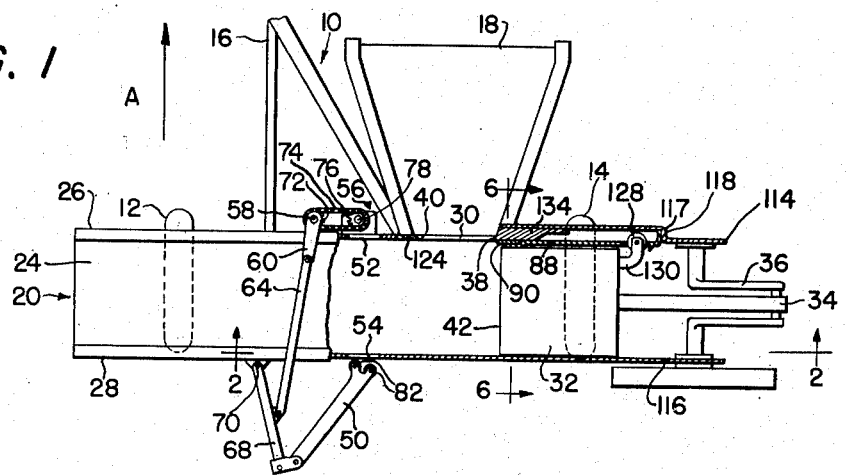

The baler structure chosen for the purposes of illustration is shown only generally and familiarity with the basic components thereof will be assumed. The baler may be of any suitable design, such as that shown in U. S. Patent 2,484,890, issued October 18, 1949, to Hill, and may include main frame structure 10 rendered mobile for advance over the field by a pair of carrying wheels 12 and 14. The main frame structure may include a forwardly extending draft frame 16 by means of which the baler may be connected to a tractor or other source of propelling power. The baler moves over the field in the direction of the arrow A in Figure 1 and conventional pick-up means 18 may be provided for picking up hay, straw or other material from the field for delivery rearwardly to a bale case or chamber designated generally by the numeral 20.

The bale case is made up of a plurality of wall elements, including a bottom wall or floor 22, a top wall 24, a front wall 26 and a rear wall 28, these walls providing means defining a bale chamber that is generally rectangular in cross section (Figure 6).

The front wall 26 of the bale case is provided with means forming a rectangular feed opening 30 through which material may be fed from the pick-up 18 into the bale case or chamber and into the path of a plunger 32 that is mounted in the bale case for reciprocation in alternate compression and retraction strokes. The plunger is reciprocated by a pitman 34 which is in turn driven from a crankshaft 36 rotatable about a longitudinal horizontal axis at the right-hand end of the baler. Familiarity with the details of a typical plunger drive has been assumed and these details have been omitted for the purposes of clarity and brevity.

Figure 2:
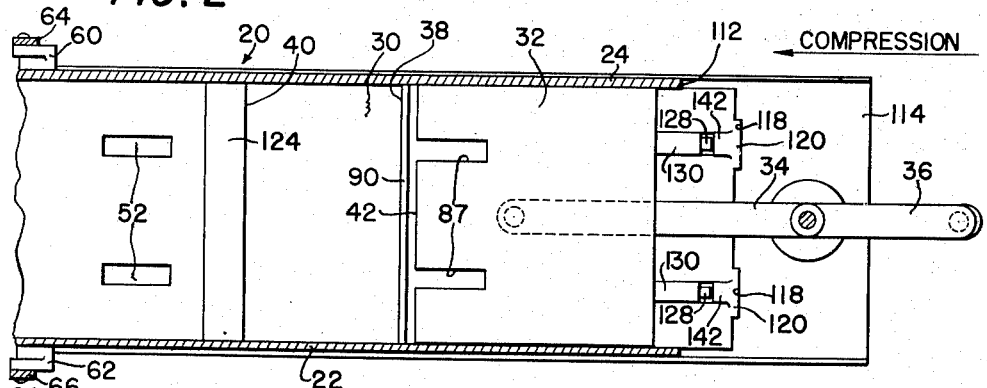
Figure 2 is a fragmentary sectional view, on an enlarged scale, as seen substantially along the line 2—2 of Figure 1, showing the plunger in its retracted position.

As best seen in Figures 1, 2 and 4, for example, the feed opening 30 is defined at its sides by a pair of transversely spaced apart vertical edge portions 38 and 40. The plunger 32 includes a leading face portion 42 which extends transversely of the bale case 20 and which is normal or perpendicular to opposite side faces 44 and 46 of the plunger. The front face 42 and the side face 44 meet or intersect at a leading corner edge portion 48. When the plunger is in its retracted position, as shown in Figures 1 and 2, the leading or front face 42 thereof is slightly to the right of the vertical edge portion 38 of the feed opening 30, and the corner edge portion 48 of the plunger is closely proximate to this vertical edge portion of the feed opening. When the plunger is at the end of its compression stroke (Figure 3), the leading face portion 42 moves considerably beyond the other vertical edge portion 40 of the feed opening 30.

Figure 3:
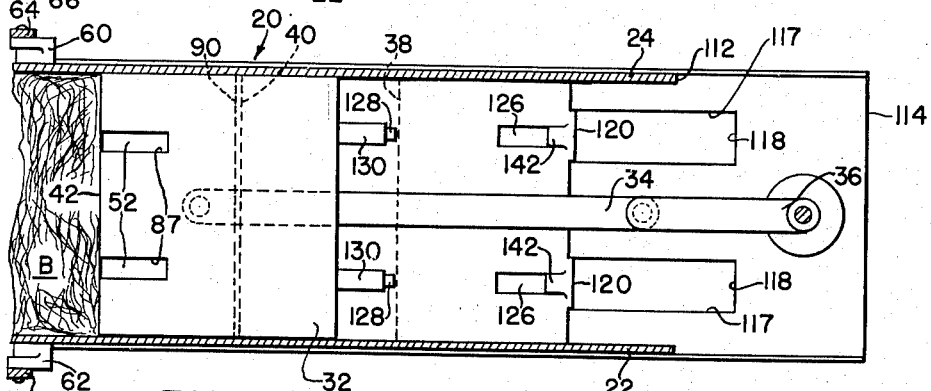
Figure 3 is a view similar to that appearing in Figure 2, but showing the plunger at the end of its compression stroke.

As the baler advances over the field and material is picked up by the pick-up 18 and delivered in successive charges to the bale chamber via the opening 30, the plunger 32 reciprocates continuously to compress or pack the charges of material into the form of a bale. Such a bale is represented in Figure 3 and is designated by the letter B. The bale is formed against a header provided by a preceding bale (not shown), as is characteristic of the conventional baler.

The baler illustrated here differs primarily from balers heretofore known in that the tying mechanism has been rearranged on the basis of possibilities incident to certain aspects of the invention as will appear below. Fundamentally, these changes involve rearrangement of the tying mechanism. Since the tying mechanism itself may be of any conventional or otherwise suitable design, only general disclosure is made of the representative form adopted to present purposes.

The tying mechanism includes a pair of tying needles 50, only one of which is shown but the presence of both of which will be apparent. These needles move alternately forwardly and rearwardly in parallel horizontal planes through slots 52 and 54 provided respectively in the bale case front and rear walls 26 and 28. One of the slots 54 in the rear wall 28 may be seen in Figure 1. A gear housing 56, containing tying mechanism to be described generally below, is located over the slots 52 in the front wall 26.

The needle 50 is shown in its retracted position in Figure 1. When it traverses or moves forwardly across the bale base, its leading end enters the gear housing 56 to accomplish its part in the tying operation. The needle is driven in timed relationship to the conclusion of the formation of a bale of predetermined length by driving mechanism including a vertical shaft 58 to the upper and lower ends of which are fixed driving arms 60 and 62 (Figure 2), these arms being respectively connected by links 64 and 66 to the needles. The needle 50 is mounted at its rear end to the rear end of a swinging arm 68 pivoted at 70 to the rear wall of the bale case. A similar swinging arm (not shown) is provided for the other needle (not shown). To the extent material here, the needle and the driving mechanism therefor may be similar to that shown in U. S. Patent 2,458,318.

The shaft 58 has keyed thereto a sprocket 72 by means of which and a chain 74 drive is transmitted to a sprocket 76 carried on a parallel shaft 78 that provides means for driving tying mechanism in the gear housing 56. As other basic components herein, the tying mechanism is illustrated and will be described only in representative fashion, since the details thereof form no part of the present invention. As far as is material here, the tying mechanism may be patterned after that shown in U. S. Patent 2,456,476, issued December 14, 1948, to West and Jones.

The leading end of the needle 50 is provided with a pair of rollers 82 which, as the needle moves forwardly through the slot 54, pick up a tying wire W and carry it across and through the slot 52 into the gear housing 56. A portion of this housing has been broken out in Figure 5 to expose a pair of carriers 84 through which a second wire $W^1$ extends. This wire extends from a suitable source of supply (not shown) through the tying mechanism gear housing 56, and along the inside face of the front wall 26 and thence around that end of the bale that is remote from the plunger 32. This wire continues back along the inside face of the rear wall 28 and out through the slot 54, constituting the wire W previously referred to as being engaged by the wire-carrying rollers 82 on the needle 50. This manner of wrapping the wire around the bale is well known and the description need not be further amplified. When the needle brings the wire portion W into the gear housing 56, this wire portion and the wire portion $W^1$ are closely proximate and parallel and the two pass through a slotted rotatable twister gear 86 which functions to twist the two wires together. After the wires are thus joined, the twisted portion is severed and that portion to the left of the twister gear 86 completes the tie for the wire around the bale just formed and that portion of the twisted wire to the right of the twister gear 86 forms a tie in the wires W and $W^1$ constituting a loop for wrapping around the leading end of the next bale to be formed. It will be understood, of course, that the structure just described is duplicated so that two wires are placed around each bale.

As mentioned above, the tying mechanism is operated in timed relationship to the attainment by the bale of a predetermined length, the means for accomplishing which have not been illustrated or described but a representative example of which is disclosed in U. S. Patent 2,484,890, referred to above. The arrangement is such that the tying operation can be accomplished without requiring disconnection of the plunger.

Since the needle 50 moves transversely forwardly across the bale chamber 20, and since the plunger 32 is reciprocable lengthwise of the chamber, it is obvious that these two elements would conflict as long as the compression stroke of the plunger is such that the leading face 42 of the plunger moves across the zone occupied by the needle (Figure 5). However, the conflict is resolved by the provision of a pair of needle-receiving slots 87 in the leading face of the plunger.

According to the present invention, there is provided an auxiliary device associated with the plunger and comprising a knife carrier 88 and a second or movable knife 90. The knife carrier is in the form of a plate that lies along the side 44 of the plunger. The knife 90 is rigidly carried at and along the leading or front edge of the carrier. The knife carrier and knife are shown apart from the plunger in Figure 7.

As shown in Figure 6, the plunger 32 includes, in addition to the opposite sides 44 and 46, top and bottom walls 92 and 94, these walls adjoining the walls or faces 44 and 46 so that the plunger has a rectangular section. Wearing strips, preferably of hard wood, are provided at 96 and 98 to carry the plunger for reciprocation in the bale case.

The plunger is provided with strips 100 and 102, preferably of angle section, which run lengthwise of the plunger substantially in the plane of the face 46. At the opposite side of the plunger, there are a pair of strips 104 and 106 of T-section and cooperating with upper and lower portions respectively of the plunger face 44 and bale case front wall 26 to provide grooves 108 and 110 in which the knife carrier 88 is slidably mounted.

As best seen in Figure 4, the knife carrier is longer than the plunger and normally projects a substantial distance at the rear end of the plunger. The right-hand end of the bale chamber terminates short of the rear end of the plunger on its retracting stroke, as indicated by the numeral 112. The lower portions of the bale chamber extend to the right in the form of frame members 114 and 116 for the purpose of carrying the bearings for the crankshaft 36. The forward wall 26 of the bale case is provided with a pair of elongated recessed portions or tracks 117 at the right-hand end of each of which is a stop 118 for engagement with cooperating stop or flange portions 120 on the knife carrier 88 when the plunger and knife carrier are at the end of their retracting strokes. A second stop is provided at 122 for engagement with the knife carrier stop 120 when the knife carrier is at the end of its cutting stroke, which is somewhat shorter than the compression stroke of the plunger, so that the plunger can overrun the knife after the knife 90 cooperates with a fixed knife 124 disposed along the vertical edge 40 of the feed opening 30, the two knives cooperating in a shearing plane to cut or sever successive charges of material fed through the feed opening 30 from the pick-up 18.

The manner in which the knife and knife carrier are carried for reciprocation at times with the plunger 32 is best shown in Figure 4. The knife carrier 88 is provided adjacent its rear end with a pair of openings or recesses 126 within which are normally received rollers 128 carried on spring-loaded arms 130 which are in turn pivoted at 132 on the inner surface of the plunger face 44. The right-hand portion of the bale case that includes a portion of the front wall 26 and a portion of the front frame member 114 includes control means 134 for controlling the action of the disconnectible elements or members comprising the knife carrier recess 126 and the plunger latch element 128—130. Since there are two sets of disconnectible elements, there will be, of course, two control means 134, one for each. Only one will be described. Each control means is housed in a track portion 117, previously described.

The control means 134 comprises an interior flat track surface 136, a cam or ramp 138, a second interior flat surface 140, and the stop 122 previously described.

When the plunger is at the end of its retracting stroke, the knife and knife carrier are connected thereto by means of the disconnectible elements 126—128—130. As the plunger moves forwardly or on its compression stroke, the knife and knife carrier are carried therewith, the knife and knife carrier thus moving on their cutting stroke. As the plunger and knife and knife carrier approach the position of Figure 4, the roller 128 rides on the interior flat surface or track 136 of the control means 134. At this point the front face 42 of the plunger has already encountered a charge of material fed through the feed opening 30 and the knife 90 is approaching the fixed knife 124. At the same time, the roller 128 is approaching the ramp 138. Continued movement of the plunger and knife and knife carrier in the direction indicated causes the roller 128 to ride up the ramp 138 so that it disengages from the recess or opening 126 in the knife carrier 88. Simultaneously, the flange or stop 120 at the rear end of the knife carrier engages the stop 122 at the right-hand end of the control means 134. Stopping of the knife and knife carrier occurs immediately after shearing between the knives 90 and 124. As the roller 128 is disengaged from the opening or recess 126, it rides onto the inner surface of the knife carrier 88 as the plunger 32 continues forwardly or on its compression stroke. Thus, in the event that the tying operation has started and the needles 50 are in their tying positions, the slots 87 in the front face of the plunger can accommodate the needles. Since the knife 90 is stopped at the position shown in Figure 5, it does not interfere with the needles.

As the plunger moves rearwardly or on its retracting stroke, the roller 128 rides along the inner face of the knife carrier 88 until it engages a stop 142 on the carrier and again drops into the opening or recess 126, picking up the knife carrier and moving it on its retraction stroke. In the event of excessive friction between the roller 128 and the inner face of the knife carrier 88, the knife and carrier may move rearwardly before the roller 128 engages the stop 142 and openings 126. However, the stop 120 at the rear end of the knife carrier will engage the stop 118 on the front frame member 114 and the rollers 128 will ultimately enter the openings 126.

When the knife carrier is in the position of Figure 5, it constitutes a closure element that closes the feed opening 30, the edge portion comprising the knife 90 occluding with the edge comprising the knife 124 fixed along the edge 46 of the feed opening. Such closure element alternately covers and uncovers the feed opening as the plunger reciprocates.

The cycles of movement of the plunger and knife and knife carrier are repeated successively, in each case the important thing being that the knife is disconnected from the plunger substantially immediately after shearing of material occurs at 90—124, so that the plunger may continue on its compression stroke without carrying the knife with it. As stated above, this avoids the necessity for slotting the knife.

It will be seen from the foregoing that the objects and features of the invention hereinbefore set forth are effectively achieved by the preferred embodiment of the invention illustrated. It will be understood, of course, that the invention may be embodied in other forms without departing from the spirit and scope of the invention as defined in the appended claims.

What is claimed is:

1. In a baler: means including a plurality of wall elements providing an elongated bale chamber of rectangular section; a plunger reciprocable lengthwise of the chamber in alternate compression and retracting strokes and having a leading material-engaging face; means in one of the wall elements providing an opening through which material is fed into the chamber to be engaged by the leading face of the plunger, said opening having an edge portion beyond which said leading face of the plunger moves on the compression stroke of the plunger; a first knife disposed generally along said edge portion; a second knife for shearing cooperation with the first knife, in a shearing zone short of the end of the compression stroke of the plunger, to cut material fed through the feed opening; means mounting the second knife for movement in alternate shearing and retracting strokes; releasable means normally interconnecting the second knife and plunger for effecting movement of the second knife respectively in shearing and retracting strokes upon reciprocation of the plunger in its compression and retracting strokes; and control means operatively related with the releasable means for effecting disconnection of the second knife from the plunger in said shearing zone so that the plunger may continue alone to the end of its compression stroke, and alternately, for effecting reconnection of said second knife and plunger upon a subsequent retracting stroke of the plunger.

2. In a baler: means including a plurality of wall elements providing a bale chamber; a plunger reciprocable in the chamber in alternate compression and retracting strokes and having a leading material-engaging face; means in one of the wall elements providing an opening through which material is fed into the chamber to be engaged by the leading face of the plunger, said opening having an edge portion beyond which said leading face of the plunger moves on the compression stroke of the plunger; means providing a first cutting element along said edge portion; a second cutting element for shearing cooperation with the first cutting element, in a cutting zone short of the end of the compression stroke of the plunger, to cut material fed through the feed opening; means mounting the second cutting element for movement in alternate cutting and retracting strokes; releasable means normally interconnecting the second cutting element and plunger for effecting movement of the second cutting element respectively in cutting and retracting strokes upon reciprocation of the plunger in its compression and retracting strokes; and control means operatively related with the releasable means for effecting, at times, disconnection of the second cutting element from the plunger in said cutting zone so that the plunger may continue alone to the end of its compression stroke, and alternately, at times, for effecting reconnection of said second cutting element and plunger upon return of the plunger in its retracting stroke.

LOUIS A. PARADISE.

REFERENCES CITED

The following references are of record in the file of this patent:

UNITED STATES PATENTS

| Number | Name | Date |
|--------|------|------|
| 515,786 | Nixon | Mar. 6, 1894 |
| 649,413 | Luzzatto | May 8, 1900 |
| 736,496 | Colman | Aug. 18, 1903 |
| 1,201,695 | Case | Oct. 17, 1916 |
| 1,205,980 | Dudley | Nov. 28, 1916 |
| 1,714,331 | Tyler | May 21, 1939 |
| 2,293,679 | Barker | Aug. 18, 1942 |
| 2,362,861 | Russell | Nov. 14, 1944 |

FOREIGN PATENTS

| Number | Country | Date |
|--------|---------|------|
| 883,683 | France | Mar. 29, 1943 |